3,409,399
PROCESS FOR THE PREPARATION OF
CARBONYL SULFIDE
Eugene R. Bertozzi, Yardley, and George Rosen, Levittown, Pa., and Marvin L. Sakowitz, Trenton, N.J., assignors to Thiokol Chemical Corporation, Bristol, Pa., a corporation of Delaware
No Drawing. Continuation of application Ser. No. 352,973, Mar. 18, 1964. This application Aug. 25, 1967, Ser. No. 663,935
13 Claims. (Cl. 23—203)

ABSTRACT OF THE DISCLOSURE

Carbonyl sulfide is produced in high yields by reacting carbon dioxide and carbon disulfide in the presence of a high surface area catalyst at temperatures between 100 and 600° C.

---

This application is a continuation of parent application Ser. No. 352,973, filed Mar. 18, 1964, now abandoned.

This invention relates to a process for the preparation of carbonyl sulfide. More specifically, it relates to a process which comprises the reaction of carbon dioxide with carbon disulfide in the presence of high surface area catalysts at moderate temperatures to produce relatively high yields of carbonyl sulfide.

Carbonyl sulfide is a reactive gas having the formula COS which is useful as an intermediate in the production of other valuable materials. Exemplary of the many useful end products which can be made using carbonyl sulfide as an intermediate, is ethylene sulfide. See Durden et al., Journal of Organic Chemistry, 26, 836 (1961).

Reichel, [J. prakt Chem. [2] 12, 71 (1875)] describes the obtention of carbonyl sulfide when $CO_2$ and $CS_2$ are passed over magnesium oxide in a porcelain tube heated to incandescence. From the description of the emerging gas, however, one can deduce that the yield was relatively low and, moreover, the reaction was effected at a temperature in the order of about 1000° C. Such a process is not commercially attractive.

There is thus a need for a commercially feasible process whereby high yields of relatively pure carbonyl sulfide may be obtained using readily available, low cost reactants and reasonable reaction parameters.

The object of the present invention is to provide a process whereby COS can be readily and economically prepared in high yields in a relatively pure condition at moderate operating temperatures.

It has now been found that relatively pure carbonyl sulfide can be produced in yields of about 80 to 90 or more by the reaction of carbon dioxide and carbon disulfide if the reaction is conducted at moderately elevated temperatures in the presence of high surface area catalysts such as activated silica gel, activated zeolites, activated alumina and activated charcoal according to the reaction:

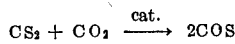

$$CS_2 + CO_2 \xrightarrow{cat.} 2COS$$

The catalyst which may be used, according to the present invention, are activated, high surface area catalysts having surface areas of the order of about 50 to 2000 square meters per gram. The manner of activating these catalysts, and the amount of active surface area available in them, varies from catalyst to catalyst. It is believed that high surface area dehydrating agents will work, generally, as catalysts in the process of the present invention.

Activated silica gel, is a porous, high surface area, adsorbent type material, prepared from the coagulation of a colloidal solution of silicic acid $H_2SiO_3$. It is a relatively hard, glassy material and may be represented by the formula $SiO_2$. Although the pore area depends on the method of production, it generally has an internal surface area of about 500–900 square meters per gram and a pore diameter of about 25–50 angstroms. The internal porosity may vary from about 35 to 40%.

The activated zeolite catalysts which may be used according to the present invention may be natural or synthetic in origin. The synthetic species are known commerically as molecular sieves and microtraps and are described in and produced by the process as disclosed in U.S. Patents 2,882,243 and 2,882,244. These materials are essentially crystalline forms of sodium aluminum silicates and its derivatives which, upon dehydration, result in an activated form consisting of a material having interconnected channels and cavities of uniform size and diameter. These zeolites may be represented by the basic formula:

$$M_{2/n}O:Al_2O_3:XSiO_2:YH_2O$$

where M is hydrogen, ammonium or metals of Groups I and II of the Periodic Table such as sodium, potassium, lithium, calcium, magnesium, etc., $n$ is the valence thereof and X and Y are number variables depending on the atomic constituents and the degree of dehydration. Since the aluminum and silicon atoms occupy essentially equivalent positions in the crystal lattice of the zeolite compound structure, the variation in X results in a different form of the zeolite having different characteristics. X may vary from about 1.8 to 3.0 and when equal to 1.85±0.5, the zeolite is known commercially as Type 4A or 5A and results in a material having a pore or channel diameter of about 4–5 angstroms and a void volume of about 45 percent. Type 4A is the sodium aluminum silicate whereas in type 5A substantially all of the sodium is replaced by calcium. Type 13X is a sodium aluminum silicate wherein X=2.5±0.5 and has a pore diameter of about 13 angstroms and a void volume of about 51 percent. These zeolites have an internal surface area of about 700–800 square meters per gram of material. In the basic formula Y may be any number or fractional part thereof up to about 6 depending on the degree of dehydration. It is believed that the activated or dehydrated natural zeolites would be equally effective in the process of the present invention.

Activated alumina, according to the present invention, is a porous, adsorptive form of $Al_2O_3$ having a high surface area which is usually produced by heating the product of the Bayer process for the production of aluminum, $Al_2O_3 \cdot 3H_2O$, to a temperature sufficient to remove most of the combined water. This temperature of activation must be controlled to effect maximum surface area and not drive the material to the so called alpha alumina state. Activated alumina may have a surface area from about 100 to about 400 sqaure meters per gram.

Activated charcoal is a high surface area, porous form of carbon, characterized by high absorptive capacity for gases, vapors, etc. These materials may contain from about 10 to over 98% carbon, the remainder being ash. The preparation of such materials usually involves the destructive distillation of a carbonaceous material such as wood or peat and a subsequent activation procedure to render the material porous and thus produce a material having a high internal surface area. This activation is generally achieved by heating the material to about 800–900° C. in the presence of steam or carbon dioxide. The resultant material has an internal surface area of from about 100 to about 1700 square meters per gram and a bulk density of from about 0.8 to 0.4 gram per milliliter.

The activated catalysts are preferably used, according to the present invention, in the form of particles having a diameter of about ⅛″ although the physical size and/or shape of the material may be varied to meet the needs of the process parameters. The catalyst particles are also preferably used in the form of a catalyst bed, through or over which the reactants are passed. The reaction system should be as free as possible of water vapor, since COS, in the presence of water, tends to form $H_2S$.

Generally, it is preferable to conduct the reaction at the lowest temperature possible since decomposition or dissociation of the desired end product, COS, and process difficulties, such as reactor component corrosion, are encountered at elevated temperatures. However, at all temperatures, there is some decomposition of the COS and/or reactants into elemental sulfur and a subsequent accumulation of this decomposition product on the surface of the catalyst. A temperature sufficiently high to retard this catalyst deactivation should, therefore, be employed. It has been found that the reaction temperature of the present invention can be varied from about 100 to 600° C. with highest yields and a minimum of process difficulties being obtained when a preferable temperature of about 125 to 450° C. is employed.

According to the present invention, the concentration of reactants may be varied over a wide range of mole ratios of $CS_2$ to $CO_2$, i.e., from 0.1:1 to 10:1, depending on the catalyst being used and the other reaction conditions employed. Generally, higher yields of COS may be obtained where the ratio of $CS_2$ to $CO_2$ is about 3:1 to 7:1. However, when the $CS_2$ concentration is increased with respect to the $CO_2$, unreacted $CS_2$ must be removed from the reaction product gases, offsetting the high yield advantages. It has been found that excess or unreacted $CS_2$ may be recycled into the reactor with no adverse effects to the process. A lower ratio of $CS_2$ to $CO_2$ would result in a higher $CO_2$ effluent content.

In order to assure optimum efficiency in the use of the catalyst bed, it is expedient that the reaction gases be contacted with the catalyst at certain rates of speed which are referred to by those in the art in terms of catalyst contact time or, more definitely, in terms of space velocity. Catalyst volume with respect to reactant gas volume as well as catalyst contact time are considered in the space velocity concept. Those in the art usually define this as the volume of gas at standard temperature and pressure per unit time $(V/t)$ passing through a given volume of catalyst space $(v_c)$, i.e., space velocity is equal to $(V/t)/v_c$ or $V/v_ct$. Time is usually expressed in hours or more exactly, reciprocal hours since $(t)$ appears in the denominator of the expression. In the present invention a space velocity of up to about 2400 volumes of gas, i.e., combined reactants in the desired mole ratio, per volume of catalyst per hour may be utilized. Space velocity is more conveniently expressed as hours$^{-1}$. The preferable space velocity in the process of the present invention varies with the choice of catalyst and other reaction conditions. Space velocities of about 200 to 1000 hours$^{-1}$ are preferably employed when using activated silica gel, activated charcoal or activated alumina and space velocities of about 25 to 400 hours$^{-1}$ are preferably employed when using the activated zeolites.

Except where process parameters or equipment considerations, such as size limitations, require, atmospheric or autogenous pressures are usually satisfactory.

The following examples are merely illustrative of the present invention and are not intended as a limitation upon the scope thereof.

Example 1

An apparatus was set up comprising essentially a heated glass reactor column 2½″ in diameter and 18″ long which was substantially completely filled with activated silica gel catalyst having a particle diameter of about ⅛″, a heating and mixing chamber wherein the carbon disulfide was volatilized and mixed with the carbon dioxide at about 150 to 180° C. prior to being introduced into the reactor column and finally a refrigerated effluent trap whereby unreacted $CS_2$ is removed from the reaction products and recycled back to the heating and mixing chamber.

The silica gel catalyst had a surface area of from about 500–900 square meters per gram, a pore diameter of about 25–50 angstroms and an internal porosity of about 35–40%.

The unit was placed on stream by introducing into the heating and mixing chamber the $CS_2$ and $CO_2$ in a mol ratio of about 3.5 to 1.0. The reaction was conducted under autogenous pressure and the reactants were passed through the catalyst bed at a space velocity of about 600 hours$^{-1}$ under substantially anhydrous conditions. The temperature was varied during the run from about 412 to 426° C. After passing through the reactor and $CS_2$ trap, the resultant effluent was collected and analyzed using a gas chromatographic technique. The following was the approximate composition of the effluent gases:

| | Percent |
|---|---|
| Carbonyl sulfide | 85.2 |
| Carbon dioxide | 10.3 |
| Carbon monoxide | 4.2 |

Examples 2 to 5

The reaction equipment and process described in Example 1 was used to demonstate the use of high surface area activated zeolite catalysts according to the present invention. The reactor column was substantially completely filled with the catalyst being evaluated in the form of particles having a diameter of about ⅛″. The reactor unit was then placed on stream by introducing the $CS_2$ and the $CO_2$ into the system in the mol ratios indicated in Table I below. The table also lists the catalyst, space velocity and reaction temperature employed in each case. After passing through the bed of catalyst in the reactor and the $CS_2$ trap, the resultant effluent was collected and analyzed using gas chromatographic techniques. The results of these analyses are also shown in Table I below. The reactions were all conducted at autogeneous pressure under substantially anhydrous conditions.

TABLE I

| Ex. | Type Molecular Sieve Catalyst | Mol Ratio $CS_2:CO_2$ | Space Velocity, hours$^{-1}$ | Reaction Temp., ° C. | Effluent Analysis* | | |
|---|---|---|---|---|---|---|---|
| | | | | | Percent COS | Percent $CO_2$ | Percent CO or air |
| 2 | 4A | 4.3/1 | 327 | 208 | 93.3 | 6.3 | 0.8 |
| 3 | 4A | 5.7/1 | 134 | 209 | 96.6 | 2.8 | 1.0 |
| 4 | 13X | 6.2/1 | 36 | 200 | 94.4 | 4.7 | 1.0 |
| 5 | 13X | 5.3/1 | 55 | 141 | 93.2 | 5.0 | 2.0 |

*Approximate gas chromatographic analysis.

Example 6

The reaction equipment and process described in Example 1 was used to demonstrate the use of a high surface area activated carbon catalyst according to the present invention. The reactor column was substantially completely filled with granules of the catalyst having a particle mesh size of from about 4 to 12. The catalyst employed was made from lignite and activated, using heat and steam, to produce a product having a surface area of from about 500 to 1200 square meters per gram, a pore diameter of about 20–38 angstroms, and a carbon content of about 76 to 83%. The reactor unit previously described was placed on stream by introducing into the heating and mixing chamber, the $CS_2$ and $CO_2$ in a mol ratio of about 3.5 to 1.0. The reaction was conducted under autogeneous pressure under substantially anhydrous conditions and at a space velocity of about 600 hours$^{-1}$. The reaction temperature varied from about 400 to 412° C. After passing through the bed of catalyst in the reactor and $CS_2$ trap, the resultant effluent was collected and analyzed using gas chromatographic techniques. The following was the approximate composition of the effluent gases:

| | Percent |
|---|---|
| Carbonyl sulfide | 78.0 |
| Carbon dioxide | 19.7 |
| Carbon monoxide | 3.4 |

Examples 7 to 10

An apparatus was set up comprising essentially a stainless steel reactor 8″ in diameter and 42″ long, an electrically heated column for volatilizing and preheating the $CS_2$ to proposed reaction temperatures, an electrically heated column for preheating the $CO_2$ to proposed reaction temperatures and finally a refrigerated effluent trap for the removal and subsequent recycling of unreacted $CS_2$ to the $CS_2$ preheater. The reactor was charged with activated alumina spheres prepared as described above and having a diameter of about 1/8″ and a surface area of from about 180 to 280 square meters per gram. The amount of catalyst charge was varied from example to example, the amount of charge varying from about ½ the volume of the reactor to a substantially completely full reactor.

The unit was placed on stream by introducing the reactants, in the mole ratio indicated in Table II and under substantially anhydrous conditions, into the preheated reactor. After emerging from the reactor and passing through the unreacted $CS_2$ trap, the COS was collected by further refrigeration and liquefaction and stored in steel cylinders. Table II gives the reaction parameters as well as the effluent analysis and percent yield based on $CO_2$ converted to COS involved in each example. The effluent was analyzed using gas chromatographic techniques. The remainder was air or CO. When the activated alumina catalyst was replaced with an inert material such as glass wool and an attempt was made to react $CS_2$ and $CS_2$ to form COS, the percent COS in the effluent was nil.

We claim:
1. A process for the preparation of carbonyl sulfide comprising reacting carbon disulfide and carbon dioxide in the presence of a catalyst selected from the group consisting of activated charcoal, activated silica gel, activated alumina and activated zeolite and having a surface area of 50–2000 square meters per gram and recovering the resulting carbonyl sulfide.
2. A process as in claim 1 in which said reacting is conducted at a temperature of about 100 to 600° C.
3. A process as in claim 1 in which said carbon disulfide and said carbon dioxide are contacted with said catalyst at a space velocity of up to 2400 hours$^{-1}$.
4. A process as in claim 1 in which said carbon disulfide and said carbon dioxide are supplied to the reaction zone in a mol ratio of about 0.1:1 to 10:1.
5. A process as in claim 1 in which said catalyst is activated charcoal.
6. A process as in claim 5 in which said catalyst has a surface area of about 100 to 1700 square meters per gram and said carbon disulfide and said carbon dioxide are contacted with said catalyst at a space velocity of about 200 to 1000 hours$^{-1}$ and reacted in a mol ratio of about 0.1:1 to 10:1 at a temperature of about 100 to 600° C.
7. A process as in claim 1 in which said catalyst is activated alumina.
8. A process as in claim 7 in which said catalyst has a surface area of about 100 to 400 square meters per gram and said carbon disulfide and said carbon dioxide are contacted with said catalyst at a space velocity of about 200 to 1000 hours$^{-1}$ and reacted in a mol ratio of about 0.1:1 to 10:1 at a temperature of about 100 to 600° C.
9. A process as in claim 1 in which said catalyst is activated silica gel.
10. A process as in claim 9 in which said catalyst has a surface area of about 500 to 900 square meters per gram and said carbon disulfide and said carbon dioxide are passed through said catalyst at a space velocity of about 200 to 1000 hours$^{-1}$ and reacted in a mol ratio of about 0.1:1 to 10:1 at a temperature of about 100 to 600° C.
11. A process as in claim 1 in which said catalyst is activated zeolite.
12. A process as in claim 11 in which said activated zeolite catalyst is a synthetic crystalline metal aluminum silicate wherein said metal is selected from the group consisting of sodium, potassium, calcium, magnesium, lithium and barium.
13. A process as in claim 12 in which said metal is sodium.

TABLE II

| Ex. | Mole Ratio, $CS_2:CO_2$ | Reaction Temp., ° C. | Space Velocity, hours$^{-1}$ | Effluent Analysis | | | |
|---|---|---|---|---|---|---|---|
| | | | | Percent COS | Percent $CO_2$ | Percent $CS_2$ | Percent Conversion* |
| 7 | 4/1 | 332 | 600 | 92 | 5 | | 90 |
| 8 | 5/1 | 327 | 900 | 77 | 4 | 5 | 88 |
| 9 | 5/1 | 400 | 300 | 90 | 4 | 1 | 92 |
| 10 | 3/1 | 233 | 240 | 89 | 7 | 3 | 86 |

*Percent conversion = $\frac{\frac{1}{2}(\text{Percent COS})}{\frac{1}{2}(\text{Percent COS}) + \text{Percent CO}_2} \times 100$

References Cited

UNITED STATES PATENTS

| 2,079,543 | 5/1937 | Bley | 23—206 |
| 2,728,638 | 12/1955 | Morningstar | 23—206 |
| 2,767,059 | 10/1956 | Adcock et al. | 23—206 |
| 2,983,580 | 5/1961 | Kerr | 23—203 |

OTHER REFERENCES

Mellor: Comprehensive Treatise on Inorganic and Theoretical Chemistry, vol. 6, p. 113.

EDWARD J. MEROS, *Primary Examiner.*

H. S. MILLER, *Assistant Examiner.*